United States Patent [19]

Maekawa et al.

[11] Patent Number: 6,096,435
[45] Date of Patent: Aug. 1, 2000

[54] THERMOPLASTIC POLYMER COMPOSITION HAVING A THERMOPLASTIC ELASTIC POLYMER AND A BLOCK COPOLYMER

[75] Inventors: Kazuhiko Maekawa; Masanari Uno, both of Kurashiki; Atsushi Itoh, Tsukuba; Hiroshi Hayashihara, Tsukuba; Kazushige Ishiura, Tsukuba; Shigeru Kawahara, Tsukuba; Shiroh Kishii, Fuwa-gun, all of Japan

[73] Assignee: Kuraray Co., Ltd., Kurashiki, Japan

[21] Appl. No.: 09/035,873

[22] Filed: Mar. 6, 1998

[30] Foreign Application Priority Data

Mar. 6, 1997 [JP] Japan .................................... 9-069220
Dec. 9, 1997 [JP] Japan .................................... 9-354025

[51] Int. Cl.$^7$ .......................... B23B 27/08; B23B 27/30; C08L 31/02; C08L 53/00; C08L 53/02
[52] U.S. Cl. .......................... 428/462; 428/463; 428/511; 428/514; 428/517; 428/520; 428/521; 428/522; 525/80; 525/89; 525/93
[58] Field of Search ................................. 525/89, 93, 80; 428/451, 462, 463, 507, 511, 519, 520, 521, 514, 522

[56] References Cited

U.S. PATENT DOCUMENTS

| | | | |
|---|---|---|---|
| H1482 | 9/1995 | St. Clair et al. | 428/457 |
| 3,923,673 | 12/1975 | Van Henten et al. | 72/42 |
| 4,366,289 | 12/1982 | Keskkula et al. | 525/63 |
| 4,921,901 | 5/1990 | Ueki et al. | 525/244 |
| 4,945,006 | 7/1990 | Muggae et al. | 428/500 |
| 5,372,870 | 12/1994 | Diehl et al. | 428/198 |
| 5,412,027 | 5/1995 | Shine et al. | 525/78 |

FOREIGN PATENT DOCUMENTS

| | | |
|---|---|---|
| 0733676 | 9/1996 | European Pat. Off. . |
| 4010511 | 10/1990 | Germany . |
| 2280189 | 1/1995 | United Kingdom . |

OTHER PUBLICATIONS

Mark et al., Encyclopedia of Polymer Science, vol. 1, Adhesive Compositions: Thermoplastic Elastomers, pp. 558–589, Aug. 1985.

*Primary Examiner*—Paul Thibodeau
*Assistant Examiner*—Ramsey Zachakia
*Attorney, Agent, or Firm*—Oblon, Spivak, McClelland, Maier & Neustadt, P.C.

[57] ABSTRACT

A thermoplastic polymer composition is provided that includes 100 parts by weight of a block copolymer and/or its hydrogenate having polymer blocks of an aromatic vinyl compound and polymer blocks of a conjugated diene compound, and from 5 to 95 parts by weight of a block copolymer having polymer blocks of an aromatic vinyl compound and/or an olefinic compound and polymer blocks having a constitutional unit derived from a (meth) acrylic compound, a laminate containing a layer of the composition, and a hot-melt adhesive that includes the composition. Because it has good melt adhesiveness, the composition of the invention can firmly adhere in melt to various polar or non-polar materials. Using the composition, it is easy to produce laminates having a layer of the composition and a layer of some other material, through melt shaping or any other melt adhesion techniques. Since the composition of the invention is satisfactorily elastic and flexible, the laminates having a layer of the composition on their surface are flexible and elastic and have a good feel, and, in addition, they are safe because of their shock absorbability and cushionability.

22 Claims, No Drawings

THERMOPLASTIC POLYMER COMPOSITION HAVING A THERMOPLASTIC ELASTIC POLYMER AND A BLOCK COPOLYMER

BACKGROUND OF THE INVENTION

1. Field of the Invention

The present invention relates to a thermoplastic polymer composition with good melt adhesiveness, a laminate containing a layer of the composition, and a hot-melt adhesive including the composition. More precisely, the invention relates to a thermoplastic polymer composition with high flexibility, high elasticity, and good mechanical and adhesive properties.

2. Description of the Prior Art

Recently, block copolymers composed of styrenic polymer blocks and dienic polymer blocks (hereinafter referred to as "styrene-diene block copolymers") and their hydrogenates have been widely used in various fields as one type of so-called thermoplastic elastomers. They exhibit rubber elasticity at room temperature but may be plasticized and melted under heat to give shaped articles that are both flexible and have good mechanical properties.

A typical application for thermoplastic elastomers is a laminate composed of a layer of such a styrene-diene block copolymer and/or its hydrogenate, and a layer of hard resin and/or metal. These laminates are desirable as high value-added products, since they have a good feel, shock absorption (cushionability) and damage-resistance because of the flexibility and elasticity of the layer of the styrene-diene block copolymer and/or its hydrogenate; and the shape-retaining functions, reinforcing ability and fixing functions of the hard resin and/or metal layer. Various parts of cars and trains are envisaged for these materials such as instrument panels, center console boxes, door trims, pillars and assist grips as well as construction materials such as doors and window frames, various parts of electric appliances such as switches and grips, plaster casts for medical use, etc.

Being relatively non-polar, styrene-diene block copolymers and their hydrogenates can be melt-adhered to or melt-integrated with relatively non-polar plastics which are similar in kind, but which are difficult to melt-adhere to highly-polar plastics and metals. Accordingly, when laminated with highly-polar materials to give composites, mechanical coupling methods must be employed in which both a layer (part) of styrene-diene block copolymer and/or its hydrogenate and a layer (part) of plastic and/or metal are formed to have engaging means capable of being coupled together, and they are coupled together at their engaging means. Alternatively, the two layers (parts) are bonded together with some other bonding means, such as chemical bonding methods and adhesives.

However, the mechanical coupling methods where the two layers (parts) are formed to have couplable engaging means require molds with complicated structures for forming those means. The formation of such molds takes a lot of time and labor, which increases the production costs. In addition, coupling of the two engaging means requires complicated operations.

The use of adhesives is also undesirable because it requires complicated steps to prepare the two layers (parts) followed by bonding. As a result, poorly-bonded composites are often produced, and organic solvents in adhesives often are detrimental in the working environment and in the global environment.

Given that situation, various techniques for improving the hot-melt adhesiveness of thermoplastic elastomers of styrene-diene block copolymers and/or their hydrogenates have heretofore been proposed. As the prior art, for example, known are (1) adhesive hot-melt compositions comprising a styrene-diene block copolymer or its hydrogenate and a thermoplastic polyurethane elastomer (see Japanese Patent Application Laid-Open No. 6-107898), (2) thermoplastic elastomer compositions comprising a thermoplastic elastomer other than thermoplastic polyester elastomers and a thermoplastic polyester elastomer (see Japanese Patent Application Laid Open No. 3-100045), and (3) olefinic elastomer compositions comprising at least one thermoplastic elastomer selected from hydrogenated styrene-diene block copolymers and ethylene/α-olefin copolymers, and an ethylene-alkyl (meth)acrylate random copolymer (see Japanese Patent Application Laid-Open No. 7-138418).

However, the prior art compositions of (1) do not have good adhesion strength, depending on the type of the materials to be laminated with the compositions, and the resulting laminates (composites) do not always last long. In addition, since the melt dispersion of the styrene-diene block copolymer or its hydrogenate and the thermoplastic polyurethane elastomer is poor, the compositions comprising these two components are often poorly dispersed blends having large grain sizes. Therefore the shaped articles of the compositions do not have good mechanical properties.

The prior art compositions of (2) also do not have good adhesion strength, depending on the type of the materials to be laminated with the compositions, and the resulting laminates (composites) do not always last long. The shaped articles of these compositions release poorly from the molds and dies used in melt-molding them, for example, through injection molding. As a result, the reproducibility of the articles is poor.

In addition, the prior art compositions of (1) and (2) have poor weather resistance. Therefore, the laminates comprising them could not be used in the open air, and their applications are limited.

The prior art compositions of (3) exhibit poor miscibility between the thermoplastic elastomer and the ethylene-alkyl (meth)acrylate random copolymer. Therefore, the compositions comprising those two components are often poorly dispersed blends having large grain sizes, and the shaped articles of the compositions often have poor mechanical properties. In addition, when the compositions are melt-molded to give shaped articles, for example, through injection molding, the dispersed phases of the compositions will be further thickened due to the shearing force applied thereto during melt-kneading them, whereby the mechanical properties of the shaped articles are worsened.

SUMMARY OF THE INVENTION

One object of the present invention is to provide a thermoplastic polymer composition having good melt adhesiveness to be able to firmly and easily adhere in melt to various materials, without interfering with the intrinsic properties of the block copolymer constituting it, such as the intrinsic elasticity, flexibility and mechanical properties of the block copolymer.

Another object of the invention is to provide a laminate comprising a layer of the thermoplastic polymer composition and a layer of some other material.

Still another object of the invention is to provide a hot-melt adhesive with good melt adhesiveness.

In order to attain these objects, we, the present inventors have assiduously studied. As a result, we have found that, when a thermoplastic elastic polymer component which includes a block copolymer having aromatic vinyl compound polymer blocks and conjugated diene compound polymer blocks, and/or a hydrogenate of the block copolymer is blended with a specific block copolymer having polymer blocks selected from aromatic vinyl compounds and olefinic compounds, and polymer blocks having a structural unit derived from at least one of (meth)acrylic compounds, in a specific ratio, then an elastic, thermoplastic polymer composition capable of firmly adhering in melt to various polar or non-polar materials irrespective of the degree of the polarity, if any, of the materials can be obtained.

In addition, we have also found that the addition of an olefenic polymer and/or a process oil to the thermoplastic polymer composition improves the shapability of the composition and improves the melt adhesiveness of the composition.

We have further found that a laminate as produced through hot melt adhesion of the thermoplastic polymer composition to some other material has high adhesion strength (peeling strength), and that, while it is used or after it has been stored long, no interlayer peeling occurs in the laminate.

We have still further found that the thermoplastic polymer composition is effectively used as a hot-melt adhesive for adhering various materials to each other. The hot-melt adhesive comprising the thermoplastic polymer composition is elastic, flexible and shock-absorbable (cushionable) by itself. On the basis of these findings, we have completed the present invention.

Specifically, the first embodiment of the invention provides a thermoplastic polymer composition that contains:

(1) 100 parts by weight of a thermoplastic elastic polymer (I) selected from the group consisting of:
  a block copolymer containing:
    (A) an aromatic vinyl polymer block, and
    (B) a conjugated diene polymer block,
  a hydrogenate of said block copolymer, and
  a mixture thereof; and (2) 5–95 parts by weight of a block copolymer (II), containing:
  (C) a polymer block containing at least one structural unit selected from the group consisting of an aromatic vinyl monomer, an olefinic monomer, and a mixture thereof, and
  (D) a polymer block containing at least one constitutional unit selected from the group consisting of (meth)acrylic acid, (meth)acrylates, and (meth)acrylonitrile, and their derivatives.

Another embodiment of the invention provides a thermoplastic polymer composition that contains:

(1) 100 parts by weight of a thermoplastic elastic polymer (I) selected from the group consisting of:
  a block copolymer containing:
    (A) an aromatic vinyl polymer block, and
    (B) a conjugated diene polymer block,
  a hydrogenate of said block copolymer, and
  a mixture thereof; and (2) a block copolymer (II), containing:
  (C) a polymer block containing at least one structural unit selected from the group consisting of an aromatic vinyl monomer, an olefinic monomer, and a mixture thereof, and
  (D) a polymer block containing at least one constitutional unit selected from the group consisting of (meth)acrylic acid, (meth)acrylates, and (meth)acrylonitrile, and their derivatives, and (3) at least one additional component selected from the group consisting of olefinic polymers, process oils, and mixtures thereof;
  wherein said block copolymer (II) is present in said thermoplastic polymer composition in an amount of 5 to 95 parts by weight relative to 100 parts by weight of the total weight of said thermoplastic elastic polymer (I) and said additional component, and wherein
  said additional component is present in said thermoplastic polymer composition in an amount of 10 to 500 parts by weight relative to 100 parts by weight of said thermoplastic elastic polymer (I).

Another embodiment of the invention provides a laminate that includes a layer of the thermoplastic polymer compositions mentioned above.

Another embodiment of the invention provides a hot-melt adhesive that includes the thermoplastic polymer compositions mentioned above.

Having good melt adhesiveness, the thermoplastic polymer composition of the invention can firmly adhere in melt to various polar or non-polar materials irrespective of the degree of the polarity, if any, of the materials. Using the composition, therefore, it is easy to produce, in a simplified manner, laminates that includes a layer of the composition and a layer of some other material, through melt shaping or any other melt adhesion techniques.

Moreover, the thermoplastic polymer composition of the invention is satisfactorily elastic and flexible. Therefore, laminates at least partly having a layer of the composition on their surface are flexible and elastic and have a good feel, and, in addition, they are highly safe because of their shock absorbability and cushionability.

Because it has excellent characteristics such as those mentioned above, the laminate of the invention which includes a layer of the thermoplastic polymer composition and a layer of some other material is effectively used in various products of many applications, for example, in various parts of cars and trains such as instrument panels, center console boxes, door trims, pillars and assist grips; various construction materials such as doors and window frames; various parts of electric appliances such as switches and grips; plaster casts for medical use, etc.

In addition, because of its high elasticity and flexibility, good mechanical properties, and good shapability and workability, the thermoplastic polymer composition of the invention is effectively used by itself in producing various shaped articles.

The hot-melt adhesive of the invention is characterized in that it can firmly adhere in melt to various polar or non-polar materials irrespective of the degree of the polarity, if any, of the materials. Because of its good hot-sealability, the adhesive can be used in hot-sealing various materials. In addition, the adhesive layer that includes the adhesive of the invention is elastic and flexible, and therefore functions as a layer capable of absorbing shock and stress. Accordingly, the adhesive layer can well absorb any external shock or stress applied thereto, or can well follow any external movement, without being broken. Thus having such a flexible and elastic structure, the adhesive layer can maintain its good adhesiveness.

The thermoplastic polymer composition of the invention, which includes the thermoplastic elastic polymer (I) and the block copolymer (II) and which additionally contains at least one of polyolefins and process oils, has much better shapability and workability and has much better melt adhesiveness to various materials.

DETAILED DESCRIPTION OF THE PREFERRED EMBODIMENTS

Various other objects, features and attendant advantages of the present invention will be more fully appreciated as the same becomes better understood from the following detailed description, which is not intended to be limiting unless otherwise specified.

Preferably, the thermoplastic elastic polymer (I) to be in the thermoplastic polymer composition of the invention comprises at least one selected from block copolymers having polymer blocks (A) consisting essentially of an aromatic vinyl compound (hereinafter referred to as "aromatic vinyl polymer blocks (A)") and polymer blocks (B) consisting essentially of a conjugated diene compound (hereinafter referred to as "conjugated diene polymer blocks (B)") and hydrogenates of those block copolymers.

The aromatic vinyl monomer constituting the aromatic vinyl polymer blocks (A) in the thermoplastic elastic polymer (I) includes, for example, various vinyl aromatic monomers such as styrene, α-methylstyrene, β-methylstyrene, o-methylstyrene, m-methylstyrene, p-methylstyrene, butylstyrene, 2,4,6-trimethylstyrene, monofluorostyrene, difluorostyrene, monochlorostyrene, dichlorostyrene, methoxystyrene, 1,3-vinyl naphthalene, vinyl anthracene, indene, and acetonaphthylene. The aromatic vinyl polymer block (A) may have either a structural unit comprising one of these aromatic vinyl monomers, or a structural unit comprising two or more of them. Preferably, the aromatic vinyl polymer block (A) consists essentially of a structural unit derived from styrene.

The aromatic vinyl polymer block (A) may contain a minor amount of a structural unit of any other comonomer, in addition to the essential structural unit of an aromatic vinyl compound such as that mentioned hereinabove. The amount of the structural unit of any other comonomer, if in the block (A), is preferably not larger than 30% by weight, more preferably not larger than 10% by weight of the block (A).

The comonomer includes, for example, ion-polymerizing monomers such as 1-butene, pentene, hexene, butadiene, isoprene, methyl vinyl ether, etc.

The conjugated diene compound constituting the conjugated diene polymer block (B) in the thermoplastic elastic polymer (I) includes, for example, isoprene, butadiene, hexadine, 2,3-dimethyl-1,3-butadiene, 1,3-pentadiene, etc. The conjugated diene polymer block (B) may comprise either one or more of these conjugated diene monomers. Preferably, the block (B) comprises either one or both of isoprene and butadiene.

The bonding mode of the conjugated diene compounds to constitute the conjugated diene polymer block (B) is not particularly limiting. For example, for butadiene, it may be polymerized at 1,2-bond and/or 1,4-bond to give a polymer block. For isoprene, it may be polymerized at 1,2-bond, 3,4-bond and/or 1,4-bond to give a polymer block. Any of those bonding modes is applicable to the polymerization of the conjugated diene compounds to give the block (B).

Where the conjugated diene polymer block (B) comprises isoprene or comprises isoprene and butadiene, it is preferable that the total of the 3,4-bonds and the 1,2-bonds of the monomers constituting the block (B) is from 1 to 95 mol %.

Where the conjugated diene polymer block (B) has a constitutional unit derived from two or more different conjugated diene compounds, the bonding mode of these monomers constituting the unit may be in any of randomized, tapered or partly blocked forms, or even a combination of two or more of those forms.

The bonding mode between the aromatic vinyl polymer block (A) and the conjugated diene polymer block (B) constituting the thermoplastic elastic polymer (I) is not particularly limiting. It may be in any of linear, branched or radial forms, or even a combination of two or more of those forms, but is preferably a linear bonding mode.

As examples of the thermoplastic elastic polymer (I) having such linear bonding modes, mentioned are di-block copolymers of A-B, tri-block copolymers of A-B-A or B-A-B, tetra-block copolymers of A-B-A-B or B-A-B-A, and poly-block copolymers comprising five or more of A and B as bonded to each other in a linear bonding form, in which A indicates the aromatic vinyl polymer block (A) and B indicates the conjugated diene polymer block (B).

Of these, preferred are tri-block copolymers of A-B-A for the thermoplastic elastic polymer (I), as being satisfactorily elastic and having good mechanical properties and good melt adhesiveness.

Preferably, the unsaturated double bonds in the conjugated diene polymer blocks (B) constituting the thermoplastic elastic polymer (I) are partly or completely hydrogenated, since the thus hydrogenated polymer (I) has good heat resistance and weather resistance. In the hydrogenated polymer (I), the degree of hydrogenation of the conjugated diene polymer blocks (B) is preferably not smaller than 50 mol %, more preferably not smaller than 60 mol %, even more preferably not smaller than 70 mol %. These ranges include all values and subranges therebetween.

In the thermoplastic elastic polymer (I), it is preferable that the proportion of the constitutional units derived from aromatic vinyl compounds to the total weight of the non-hydrogenated polymer (I) is from 5 to 75% by weight, more preferably from 5 to 45% by weight in view of the elasticity, flexibility and mechanical properties of the polymer (I). These ranges include all values and subranges therebetween.

The molecular weight of the aromatic vinyl polymer block (A) and that of the conjugated diene polymer block (B) constituting the thermoplastic elastic polymer (I) are not particularly limiting. Preferably, however, in the polymer (I) not hydrogenated, the number-average molecular weight of the aromatic vinyl polymer block (A) falls between 500 and 100,000, and that of the conjugated diene polymer block (B) falls between 2,500 and 400,000. These ranges include all values and subranges therebetween.

Also preferably, the number-average molecular weight of the thermoplastic elastic polymer (I) not hydrogenated falls between 3,000 and 500,000, in view of the mechanical properties and the shapability and workability of the polymer (I). These ranges include all values and subranges therebetween.

The number-average molecular weight as referred to herein is obtained on the basis of the calibration curve of standard polystyrene through gel permeation chromatography (GPC).

As the case may be, the thermoplastic elastic polymer (I) may have one or more polar groups such as hydroxyl groups, carboxyl groups, epoxy groups and halide groups, at its molecular chain terminals and/or in its molecular chain.

Methods for producing the thermoplastic elastic polymer (I) are not particularly limiting, and the polymer (I) can be produced in any known conventional methods. For example, it may be produced through any of ionic polymerization such as anionic polymerization or cationic polymerization, single site polymerization or radical polymerization.

In anionic polymerization to obtain the polymer (I), for example, an aromatic vinyl compound and a conjugated diene compound are successively polymerized in an inert organic solvent such as n-hexane or cyclohexane, using an alkyl lithium compound as the polymerization initiator, to give a block copolymer having a desired molecular structure and a desired molecular weight, to which is added ethylene oxide or propylene oxide, and thereafter an active hydrogen compound, which may be selected from, for example, alcohols, carboxylic acids and water, is added to the reaction system to terminate the polymerization.

Preferably, the block copolymer as obtained in the manner mentioned above is hydrogenated in an inert organic solvent in the presence of a hydrogenation catalyst, according to a known method, to obtain a hydrogenated, thermoplastic elastic polymer (I).

Preferably, the block copolymer (II) to be in the thermoplastic polymer composition of the invention has polymer blocks (C) consisting essentially of at least one compound selected from aromatic vinyl compounds and olefinic compounds, and polymer blocks (D) having a constitutional unit derived from at least one of (meth)acrylic compounds.

The polymer block (C) constituting the block copolymer (II) may be composed of an aromatic vinyl compound alone, or an olefenic compound alone, or both an aromatic vinyl compound and an olefinic compound, or at least one of an aromatic compound and an olefinic compound as combined with a minor amount of any other comonomers. It is desirable that the polymer block (C) consists essentially of an olefinic compound, since the thermoplastic polymer composition comprising such block copolymer (II) has better melt adhesiveness.

Where the polymer block (C) comprises two or more monomers of an aromatic vinyl monomer and an olefmic monomer, the bonding mode of these monomers may be in any of randomized, tapered or partly blocked forms or even in a combination of those forms.

The aromatic vinyl compound capable of constituting the polymer block (C) includes, for example, various vinyl aromatic monomers such as styrene, α-methylstyrene, β-methylstyrene, o-methylstyrene, m-methylstyrene, p-methylstyrene, t-butylstyrene, 2,4,6-trimethylstyrene, monofluorostyrene, difluorostyrene, monochlorostyrene, dichlorostyrene, methoxystyrene, 1,3-vinyl naphthalene, vinyl anthracene, indene, and acetonaphthylene. The polymer block (C) may have either a structural unit comprising one of these aromatic vinyl monomers, or a structural unit comprising two or more of them.

The olefinic monomer capable of constituting the polymer block (C) includes, for example, olefins having from 2 to 10 carbon atoms, and dienic hydrocarbon compounds. Concretely mentioned are ethylene, propylene, isobutylene, pentene, hexene, octene, butadiene, isoprene, etc. Where the polymer block (C) has a constitutional unit comprising a dienic hydrocarbon such as butadiene or isoprene, it is preferably hydrogenated to have an olefinic form.

Of those mentioned above, the polymer block (C) preferably comprises one or more of polymers of polystyrene, polyethylene, polypropylene, polyisobutylene, polybutene, polyisoprene and polybutadiene, and their hydrogenates, since the block copolymer (II) comprising such polymer blocks (C) is highly miscible with the thermoplastic elastic polymer (I) to give a thermoplastic polymer composition with better mechanical properties and better melt adhesiveness.

The polymer blocks (D) constituting the block copolymer (II) have a constitutional unit derived from at least one of (meth)acrylic compounds. Preferably, the polymer block (D) has the (meth)acrylic compound-derived constitutional unit in an amount of from 10 to 100 mol %, more preferably from 20 to 100 mol %, even more preferably from 30 to 100 mol % of all constitutional units constituting the polymer block (D). These ranges include all values and subranges therebetween.

If the amount of the (meth)acrylic compound-derived constitutional unit in the polymer block (D) is smaller than 10 mol %, the melt adhesiveness of the thermoplastic polymer composition comprising such block copolymer (II) will tend to be poor.

The (meth)acrylic compound constituting the polymer block (D) includes, for example, (meth)acrylic acid, (meth) acrylates, (meth)acrylonitrile and their derivatives. Concretely mentioned are acrylic acid, methacrylic acid, methyl acrylate, ethyl acrylate, propyl acrylate, butyl acrylate, 2-ethylhexyl acrylate, dodecyl acrylate, 2-hydroxy ethyl acrylate, methyl methacrylate, ethyl methacrylate, propyl methacrylate, butyl methacrylate, 2-ethylhexyl methacrylate, dodecyl methacrylate, 2-hydroxy ethyl methacrylate, glycidyl acrylate, glycidyl methacrylate, dimethylaminoethyl acrylate, dimethylaminoethyl methacrylate, and their quaternary salts (e.g., hydrochlorides, p-toluene sulfonates, etc.), and also acrylonitrile and methacrylonitrile. The polymer block (D) may have a constitutional unit derived from one or more of those (meth)acrylic compounds.

Preferably, the polymer block (D) has a constitutional unit derived from one or more of methyl methacrylate, ethyl acrylate, acrylic acid and acrylonitrile, in view of the melt adhesiveness and the shapability of the thermoplastic polymer composition comprising such block copolymer (II).

As has been mentioned hereinabove, the polymer block (D) may have a constitutional unit derived from a comonomer other than the above (meth)acrylic compounds, preferably in an amount of not larger than 90 mol %, more preferably not larger than 80 mol %, even more preferably not larger than 70 mol %, in addition to the (meth)acrylic compound derived constitutional unit. These ranges include all values and subranges therebetween.

The comonomer employable for the polymer block (D) includes, for example, aromatic vinyl monomers such as styrene, α-methylstyrene, p-styrene sulfonic acid and its sodium salt and potassium salt; vinyl ester monomers such as vinyl formate, vinyl acetate, vinyl propionate, vinyl pivalate, vinyl butyrate, vinyl valerate, vinyl caprate, vinyl benzoate, vinyl trifluoroacetate; carboxyl-containing unsaturated monomers such as crotonic acid, cinnamic acid, itaconic acid, maleic acid; epoxy-containing unsaturated monomers such as glycidyl itaconate, allyl glycidyl ether, 2-methyl allyl glycidyl ether, styrene-p-glycidyl ether, 3,4-epoxy butene, 3,4-epoxy-3-methyl-1-butene, 3,4-epoxy-3-methyl-1-pentene, 5,6-epoxy-1-hexene, vinyl cyclohexene monoxide, p-glycidyl styrene; carboxyl anhydride-containing unsaturated monomers such as maleic anhydride, itaconic anhydride, citraconic anhydride, butenyl succinic anhydride, tetrahydrophthalic anhydride, etc.

Of these comonomers, the units as derived from vinyl ester monomers may be processed with acids or alkalis into vinyl alcohol units, which, of course, can be used in the invention.

The polymer block (D) may have a constitutional unit derived from one or more of those comonomers.

Preferably, the polymer block (C) constituting the block copolymer (II) has a number-average molecular weight of from 300 to 100,000, more preferably from 2,500 to 50,000. The polymer block (D) constituting it preferably has a number average molecular weight of from 1,000 to 100,000, more preferably from 2,000 to 50,000. Preferably, the number average molecular weight of the block copolymer (II) falls between 1,300 and 200,000, more preferably between 4,500 and 100,000. These ranges include all values and subranges therebetween.

The block copolymer (II) having a number-average molecular weight falling within the defined range as above is highly miscible with the thermoplastic elastic polymer (I), and gives, along with the polymer (I), a thermoplastic polymer composition with better mechanical properties and better melt adhesiveness.

Methods for producing the block copolymer (II) are not particularly limiting. For example, the block copolymer (II) may be produced in the manner mentioned below. A monomer component to constitute the polymer block (C) [or polymer block (D)] is radical-polymerized in the presence of a thio-S-carboxylic acid or a compound having a thioester group and a mercapto group in the molecule such as 2-acetylthioethylthiol and 10-acetylthiodecanethiol, and the resulting polymer is processed with an alkali such as ammonia or with an acid such as hydrochloric acid or sulfuric acid to make the polymer have a mercapto group at its one end. Next, in the presence of the thus-prepared polymer, a monomer component to constitute the polymer block (D) [or polymer block (C)] is radical-polymerized to prepare the block copolymer (II). According to this method, it is easy to efficiently prepare the block copolymer (II) having the intended number-average molecular weight and molecular weight distribution.

Where the thermoplastic polymer composition of the invention contains none of olefinic polymers and/or process oils, it comprises 100 parts by weight of the thermoplastic elastic polymer (I) and from 5 to 95 parts by weight, preferably from 20 to 70 parts by weight of the block copolymer (II). These ranges include all values and subranges therebetween. If the amount of the block copolymer (II) to be in the thermoplastic polymer composition is smaller than 5 parts by weight relative to 100 parts by weight of the thermoplastic elastic polymer (I), the melt adhesiveness of the composition to polar materials is poor; but if it is larger than 95 parts by weight, the composition and products comprising it are too hard and have low strength and ductility.

The thermoplastic polymer composition of the invention may contain at least one of olefinic polymers and process oils, in addition to the thermoplastic elastic polymer (I) and the block copolymer (II). Where the thermoplastic polymer composition additionally contains any of olefinic polymers and/or process oils, the additional component therein acts as a shapability improver to further improve the melt shapability of the composition. Therefore, containing the additional component, the thermoplastic polymer composition can be continuously molded into shaped articles through injection molding with high producibility without any trouble, and its melt adhesiveness is much more improved.

As examples of the olefinic polymers, mentioned are polypropylene, polyethylene, and ethylene-α-olefin copolymers. As the process oils, employable is any of paraffinic process oils and naphthenic process oils.

Where the thermoplastic polymer composition of the invention additionally contains any of olefinic polymers and/or process oils, it is desirable that the amount of the additional component to be in the composition is from 10 to 500 parts by weight relative to 100 part by weight of the thermoplastic elastic polymer (I) to be in the composition. The amount indicates the total amount of the olefinic polymer and the process oil, where the thermoplastic polymer composition contains the two in combination. Where the thermoplastic polymer composition of the invention additionally contains any of olefinic polymers and/or process oils, it is also desirable that the composition contains from 5 to 95 parts by weight of the block copolymer (II) relative to 100 parts by weight of the total of the thermoplastic elastic polymer (I) and the additional component of olefinic polymers and/or process oils. If the amount of the additional component of olefinic polymers and/or process oils to be in the thermoplastic polymer composition is more than 500 parts by weight relative to 100 parts by weight of the thermoplastic elastic polymer (I) in the composition, the mechanical properties, such as strength and ductility of the composition are thereby worsened, often resulting in that the composition loses its elasticity.

If desired, the thermoplastic polymer composition of the invention may further contain any other components such as styrenic resins, polyphenylene ether-type resins, low molecular-weight polyethylene, and polyethylene glycol. If the thermoplastic polymer composition contains any of those optional components, it is desirable that the amount of the block copolymer (II) to be in the composition falls between 5 and 95% by weight relative to the total of such optional components and the thermoplastic elastic polymer (I), in view of the mechanical properties, the melt adhesiveness and the shapability of the composition.

In addition, the thermoplastic polymer composition of the invention may further contain, if desired, one or more other components, such as fillers (e.g., glass fiber, carbon fiber, talc, titanium oxide, calcium oxide), pigments, antioxidants, thermal aging inhibitors, ultraviolet absorbents, flame retardants, mold lubricants, defoaming agents and fragrances, apart from the components mentioned hereinabove.

Methods for preparing the thermoplastic polymer composition of the invention are not particularly limiting. For preparing it, employable are any ordinary melt-kneading methods of uniformly mixing the thermoplastic elastic polymer (I), the block copolymer (II) and other additional and/or optional components. For this, generally employed are melt-kneading methods. To melt-knead these components, for example, used are melt-kneading devices such as single-screw extruders, double-screw extruders, kneaders, Bumbury mixers, etc. Using any of these devices, the components are kneaded generally at a temperature falling between 170 and 270° C. or so for 3 to 30 minutes or so to give the thermoplastic polymer composition of the invention.

The thermoplastic polymer composition of the invention can be shaped into various shaped articles by itself. The shaped articles of the thermoplastic polymer composition alone have high elasticity and flexibility and good mechanical properties. To shape the thermoplastic polymer composition, employable are any ordinary shaping methods that are generally used in shaping thermoplastic polymers. For example, employed is any desired method of injection molding, extrusion molding, compression molding, blow molding, calender molding or casting.

In addition, the thermoplastic polymer composition of the invention has extremely good melt adhesiveness, and can firmly adhere in melt to various polar and non-polar materials (e. g., plastics, rubber, metal, wood, ceramics, paper, fabric, etc.) irrespective of the degree of the polarity, if any, of the materials. Therefore, the thermoplastic polymer composition is especially effectively used in producing laminates with any other materials. Accordingly, the present invention encompasses such laminates comprising a layer of the thermoplastic polymer composition of the invention and a layer of some other material.

In those laminates, the other materials to be used are not particularly limiting, and any and every desired material is employable herein. In addition, in those, the number of the layers, and also the thickness, the shape and the structure of each layer are not particularly limiting, and can be suitably determined in accordance with the use of the laminates.

Though not particularly limiting, mentioned are some embodiments of the laminates of the invention, which include a laminate having one layer of the thermoplastic polymer composition and one layer of some other material; a laminate having two layers of the thermoplastic polymer composition between which is sandwiched a layer of some other material; a laminate having a layer of the thermoplastic polymer composition as sandwiched between layers of some other material; and a laminate having at least one layer of the thermoplastic polymer composition and having two or more layers of the same or different other materials.

For the laminate having two or more layers of some other material, the material of each of those plural layers may be the same or different. For the laminate having two or more layers of the thermoplastic polymer composition of the invention, the composition of each of those plural layers may be the same or different.

Of the laminates of the invention, those comprising a layer of the highly elastic and flexible, thermoplastic polymer composition of the invention and a layer of a hard material are widely noticed as high value-added products having both the good properties of the thermoplastic polymer composition and those of the hard material, and are extremely useful.

As the hard material for those laminates, preferred are hard resins and/or metals having a modulus of bending elasticity of not smaller than 1000 kg/cm$^2$ as measured according to JIS K 7203.

Though not limitative, the hard resins satisfying the above-mentioned requirement include, for example, styrenic resins such as polystyrenes, rubber-reinforced polystyrenes (HIPS resins), acrylonitrile-butadiene-styrene copolymers (ABS resins), acrylonitrile-styrene copolymers (AS resins), methyl methacrylate-styrene copolymers (MS resins), methyl methacrylate-butadiene-styrene copolymers (MBS resins); polyphenylene ether-type resins; acrylic resins such as polymethyl methacrylates; chlorine-containing vinylic resins such as polyvinyl chlorides, polyvinylidene chlorides, vinyl chloride-vinyl acetate copolymers, vinyl chloride-ethylene copolymers; olefinic resins such as polyethylenes, polypropylenes; polycarbonate resins; polyester resins such as polyethylene terephthalates, polybutylene terephthalates, polyethylene naphthalates, polybutylene naphthalates; polyamide resins such as nylon 6, nylon 66, semi-aromatic nylons; polysulfone resins, polyoxymethylene resins; polyvinylidene fluoride resins, etc.

The metallic materials include, for example, iron, aluminum, copper, and various alloys such as stainless steel, tin plates, galvanized steel sheets, etc.

The present invention encompasses, as its one preferred embodiment, a laminate comprising a layer of one or more hard materials such as those mentioned above, and a layer of the thermoplastic polymer composition of the invention, as laminated together through melt adhesion of the two.

In addition, laminates comprising a layer of the thermoplastic polymer composition of the invention and a layer of soft material also have various applications, and are effectively used in various fields. Those laminates are also within the scope of the invention. The soft material includes, for example, various types of synthetic rubber, such as isoprene rubber, butadiene rubber, butadiene-styrene rubber, butadiene-acrylonitrile rubber, chloroprene rubber, butyl rubber, urethane rubber, silicone rubber, fluorine rubber, acrylonitrile rubber; and also various thermoplastic elastomers. One or more of those soft materials are employable herein.

Methods for producing laminates comprising a layer of the thermoplastic polymer composition and a layer of some other material are not particularly limiting. For producing them, employable is any and every known method of producing ordinary laminates through melt adhesion. Of known methods, preferably used for smoothly producing the laminates of the invention is any of injection molding, extrusion molding, blow molding, calender molding, compression molding or casting. The preferred method is selected, depending on the type and the properties of the material to be laminated with the layer of the thermoplastic polymer composition, and also on the use and the type of the products to be produced.

Where the laminates of the invention are produced through injection molding, employable is any of the following methods, which, however, are not whatsoever limiting. One method comprises injecting a thermoplastic material except the thermoplastic polymer composition of the invention (for example, hard resin) into a first mold to prepare a first shaped article, then taking the first shaped article out of the first mold and inserting it into a second mold, into which a thermoplastic polymer composition of the invention is injected to produce an intended laminate. Another method comprises preparing a first shaped article in the same manner as above in a first mold, then expanding the cavity of the first mold while the first shaped article is still therein, and thereafter injecting a thermoplastic polymer composition of the invention into the thus-expanded first mold to produce an intended laminate. In these injection molding methods, the order of injecting the two materials may be reversed, or that is, a thermoplastic polymer composition of the invention may be first injected into the first mold to prepare a first shaped article, and thereafter a different thermoplastic material (for example, hard resin) is laminated over this through injection molding to obtain the intended laminate. In a still different manner, a thermoplastic polymer composition of the invention and a different thermoplastic material may be, either all at a time or one after another at a predetermined time interval, injected into one and the same mold to produce an intended laminate.

On the other hand, where a laminate comprising a layer of the thermoplastic polymer composition of the invention and a layer of a different thermoplastic material is produced through extrusion molding, employable is a co-extrusion method of co-extruding the composition of the invention and the different thermoplastic material to give two or more layers, while being welded together, through a split mold of which the inner and outer parts, or the upper and lower parts, or the left and right parts are divided into two or more for plural layers (precisely, through split extrusion dies). Where a non-thermoplastic material is combined with a thermoplastic polymer composition of the invention to produce laminates, the layer of the non-thermoplastic material is coated with the composition of the invention by melt-extruding the latter onto or around the former.

Where laminates comprising a layer of the thermoplastic polymer composition of the invention and a layer of a different material are produced through calender molding, a melt of the composition of the invention is calendered over the different material which has been plasticized in melt or which is still in solid, and the two are laminated together.

Where laminates are produced through compression molding, a melt of the thermoplastic polymer composition of the invention is pressed against a different material.

The type, the shape, the structure and the use of the laminate of the invention are not specifically defined, and any and every laminate having a layer of the thermoplastic polymer composition of the invention and a layer of some other material, as mentioned hereinabove, is within the scope of the invention.

Though not limiting, examples of the laminate of the invention include various parts of cars and trains such as instrument panels, center console boxes, door trims, pillars and assist grips; various construction materials such as doors and window frames; various parts of electric appliances such as switches and grips; packing materials for air shields; various joints; valve parts; plaster casts for medical use; and other various products.

The laminates where the layer of a thermoplastic polymer composition of the invention is at least in one outermost surface have a soft and good feel, since the layer of the composition is elastic and flexible. In addition, since the laminates of that type have good shock absorbability (cushionability) and high impact resistance, they are highly safe in use.

The thermoplastic polymer composition of the invention can firmly adhere in melt to various polar or non-polar materials irrespective of the degree of the polarity, if any, of the materials. As being characterized by such its good melt adhesiveness, the thermoplastic polymer composition can be effectively used as a hot-melt adhesive. Accordingly, the present invention encompasses a hot-melt adhesive comprising the thermoplastic polymer composition of the invention.

Though not limiting, where the hot-melt adhesive comprising the thermoplastic polymer composition of the invention is used in bonding metal to metal, or metal to hard resin material, or hard resin material to hard resin material, or hard resin material to wood, the adhesive layer of the hot-melt adhesive functions also as a layer capable of absorbing shock and stress because of its good elasticity and flexibility. Accordingly, the adhesive layer can well absorb any external shock or stress applied thereto, or can well follow any external movement, without being broken. Thus having such a flexible and elastic structure, the adhesive layer can maintain its good adhesiveness.

In its practical use for adhesion, the hot-melt adhesive of the invention can be in any form of films, sheets, rods, linear strips, pellets, and powders.

In practically using the hot-melt adhesive of the invention for adhesion, employable are any conventional methods and devices that have heretofore been generally used for adhesion with ordinary hot-melt adhesives.

EXAMPLES

Now, the invention is described in more detail hereinunder with reference to the following Examples and Comparative Examples, which, however, are not intended to restrict the scope of the invention. In the following Examples and Comparative Examples, test samples were prepared according to the method mentioned below, and their physical properties were measured according to the methods also mentioned below.

Preparation of Test Samples:

0.1 parts by weight of an antioxidant ("Irganox 1010", manufactured by Ciba-Geigy AG) was added to 100 parts by weight of the thermoplastic polymer composition or the thermoplastic elastic polymer (I) used in each Example or Comparative Example, and the resulting mixture was melt-kneaded through a double-screw extruder ("TEM35B", manufactured by Toshiba Machine Co.) at 230° C., and then injected into an injection-molding machine (manufactured by Sumitomo Machinery Co.) under an injection pressure of 50 kg/cm$^2$, at an injection temperature falling between 180 and 230° C., and at a mold temperature of 40° C., to prepare test pieces (size: length×width×thickness=200 mm×150 mm×2 mm), which are for measuring and evaluating their tensile strength, tensile elongation, hardness and outward appearance.

Measurement of Tensile Strength and Tensile Elongation:

The tensile strength and the tensile elongation of the test samples prepared as above were measured according to JIS K 6301.

Measurement of Hardness:

The hardness of the test samples prepared above was measured according to JIS K 6301 (Method A).

Evaluation of Outward Appearance of Shaped Articles:

The test samples (shaped articles) prepared above were visually observed. Those of which the surface was entirely smooth with no flow marks were ranked as "A"; those of which the surface was partly rough with some flow marks were ranked as "B"; and those of which the surface was entirely rough with many flow marks thereon were ranked as "C".

Measurement of Peeling Strength:

(1) A hard resin sheet (size: length×width×thickness=200 mm×150 mm×1 mm) or a metal sheet (size: length×width×thickness=200 mm×150 mm×0.2 mm) was previously set in the same mold as that used f or preparing the test samples in the above, and the same melt mixture as that also used for preparing the test samples was injected thereinto under the same condition as above, to thereby prepare a laminate (size: length×width×thickness=200 mm×150 mm×2 mm) having a layer of the thermoplastic polymer composition or a layer of the thermoplastic elastic polymer (I) as laminated on one surface of the hard resin sheet or the metal sheet.

(2) Test samples (size: length×width×thickness=80 mm×25 mm×2 mm) were cut out of the laminate prepared in (1), and subjected to the "180 degree peeling test" of JIS K 6854 to measure the peeling strength of each sample.

Continuous Shapability:

The laminate as above was continuously produced, whereupon measured was the time before the shaped articles had flow marks on their surface, or before the shaped articles lost their surface smoothness, or before the shaped articles became difficult to release from the, mold resulting in that the continuous production of the articles became impossible. The laminate that had been continuously produced for 300 hours or longer was ranked as "A"; that having been continuously produced for longer than 100 hours but shorter than 300 hours was ranked as "B"; and that troubled in its continuous production within 100 hours was ranked as "C".

The abbreviation of each thermoplastic elastic polymer (I) used in the following Examples and Comparative Examples; the abbreviation of each hard resin constituting the hard resin sheet as used in producing the laminate in the following Examples and Comparative Examples; and the abbreviation of each polar thermoplastic polymer (polar polymer) as used in the following Comparative Examples 4 to 7 are as follows:

Thermoplastic Elastic Polymer (I):

SEPS (1):
Hydrogenated tri-block copolymer of polystyrene block-polyisoprene block-polystyrene block (having a number-average molecular weight of 50,000; a styrene content of 13% by weight, and a degree of hydrogenation at the polyisoprene block of 98%).

SEPS (2):
Hydrogenated tri-block copolymer of polystyrene block-polyisoprene block-polystyrene block (having a number-average molecular weight of 100,000; a styrene content of 30% by weight, and a degree of hydrogenation at the polyisoprene block of 98%).

SEEPS (1):
Hydrogenated tri-block copolymer of polystyrene block-isoprene/butadiene copolymer block-polystyrene block (having a number-average molecular weight of 50,000: a styrene content of 13% by weight, a ratio by weight of isoprene/butadiene of 70/30, and a degree of hydrogenation at the isoprene/butadiene copolymer block of 97%).

SEEPS (2)
Hydrogenated tri-block copolymer of polystyrene block-isoprene/butadiene copolymer block-polystyrene block (having a number-average molecular weight of 200,000; a styrene content of 30% by weight, a ratio by weight of isoprene/butadiene of 40/60, and a degree of hydrogenation at the isoprene/butadiene copolymer block of 98%).

Hard Resin of Hard Resin Sheet:

ABS:
Acrylonitrilelbutadiene/styrene copolymer resin ("SYCOLAC EX111", manufactured by General Electric Co.)

PP:
Polypropylene resin ("J115G", manufactured by Ube Kosan Co.)

PMMA:
Methyl methacrylate resin ("Parapet L1225", manufactured by Kuraray Co.)

PBT:
Polybutylene terephthalate resin ("HAUZER R113", manufactured by Kuraray Co.)

POM:
Polyoxymethylene resin ("DURACON M90-44", manufactured by Polyplastic Co.)

PC: Polyearbonate resin ("PANLITE GF", manufactured by Teijin Ltd.)

PPE:
Polyphenylene ether resin ("NORYL 731", manufactured by General Electric Co.)

PA66:
Nylon 66 resin ("LEONA 66, 1300S", manufactured by Asahi Chemical Co.)

PVC:
Polyvinyl chloride resin ("TH800", manufactured by Kyodo Vinyl Chloride Co.)

PVDF:
Polyvinylidene fluoride resin ("VP 832", manufactured by Daikin Industrial Co.)

PVDC:
Polyvinylidene chloride resin (resin for Saran Wrap, manufactured by Asahi Chemical Co.)

Polar Thermoplastic Polymer (polar polymer):

Polar polymer (a):
Polyester-type thermoplastic elastomer ("GRILAX E120", manufactured by Dai-Nippon Ink Chemical Co.)

Polar polymer (b):
Thermoplastic elastic polymer having polyether blocks and polyamide blocks ("PEBAX 63333SA00", manufactured by Toray Co.)

Polar polymer (c):
Polyurethane-type thermoplastic elastomer ("MIRACTOLAN E568", manufactured by Nippon Miractolan)

Polar polymer (d):
Ethylene/ethyl acrylate random copolymer ("DPDJ 6182", manufactured by Nippon Unicar Co.)

Reference Example 1

[Production of Block Copolymer (II-1) (di-block copolymer of polystyrene block-polymethyl methacrylate block)]

(1) 75 kg of styrene was fed into a 90-liter polymerizer, and heated in a nitrogen atmosphere until the inner temperature reached 90 ° C. After 30 minutes, 32 g of thio-S-acetic acid was added thereto, and a 7 wt. % solution of a radical polymerization initiator, "V-65" (manufactured by Wako Pure Chemicals Co.) in toluene was added thereto at a flow rate of 430 ml/hr while a 6 wt. % solution of thio-S-acetic acid in toluene was added thereto at a flow rate of 750 ml/hr, whereupon the polymerization of the monomer was initiated. Then, the polymerization was stopped just after the degree of polymerization (the degree of conversion into polymer) reached 40%, and the contents of the polymerizer were cooled. From the resulting viscous liquid, removed were the solvent and the non-reacted monomer. Thus was obtained polystyrene having a thio-S-acetate group at its one end and having a number-average molecular weight of 10,000.

(2) 30 kg of polystyrene obtained in (1), 30 kg of toluene and 15 kg of butanol were fed into a 90-liter reactor, and 153 ml of a 10 wt. % solution of sodium hydroxide in methanol was added thereto at 70° C., thereby interesterifying the terminal thio-S-acetate group of the polystyrene. After 2 hours, 30 g of acetic acid was added to the reactor to stop the reaction. The solvent was removed from the resulting reaction mixture to obtain mercapto-terminated polystyrene.

(3) 30 kg of methyl methacrylate, 48 kg of toluene, and 30 kg of the mercapto-terminated polystyrene that had been obtained in (2) were fed into a 200-liter polymerizer, which was then fully purged with nitrogen at 90° C. Next, a 10 wt. % solution in toluene of the same radical polymerization initiator as that used in (1) was fed into the polymerizer at a flow rate of 54 ml/hr to initiate the polymerization of the monomer. Then, the polymerization was stopped just after the degree of polymerization (the degree of conversion into polymer) reached 95%. From the resulting reaction mixture, removed were the solvent and the non-reacted monomer. Thus was obtained a di-block copolymer of polystyrene block-polymethyl methacrylate block. This is hereinafter referred to as block copolymer (II-1).

(4) In the block copolymer (II-1) obtained in (3), the number-average molecular weight of the polystyrene block was 10,000, and that of the polymethyl methacrylate block was 11,000. The block copolymer (II-1) thus had a number-average molecular weight of 21,000, and its molecular weight distribution was 2.1.

Reference Example 2

[Production of Block Copolymer (11-2) (di-block copolymer of polystyrene block-ethyl acrylate/ acrylic acid copolymer block)]

(1) Mercapto-terminated polystyrene was prepared in the same manner as in (1) and (2) of Reference Example 1.

(2) 28.5 kg of ethyl acrylate, 1.5 kg of acrylic acid, 48 kg of toluene, and 30 kg of tie mercapto-terminated polystyrene that had been obtained in (1) were fed into a 200-liter polymerizer, which was then fully purged with nitrogen at 70° C. Next, a 2 wt. % solution in toluene of a radical polymerization initiator, "V-70" (manufactured by Wako Pure Chemicals Co.) was fed into the polymerizer at a flow rate of 270 ml/hr to initiate the polymerization of the monomer. Then, the polymerization was stopped just after the degree of polymerization (the degree of conversion into polymer) reached 95%. From the resulting reaction mixture, removed were the solvent and the non-reacted monomer. Thus was obtained a di-block copolymer of polystyrene block-ethyl acrylate/acrylic acid copolymer block. This is hereinafter referred to as block copolymer (II-2).

(3) In the block copolymer (II-2) obtained in (2), the number-average molecular weight of the polystyrene block was 10,000, and that of the ethyl acrylate/acrylic acid copolymer block was 9,500. The block copolymer (II-2) thus had a number-average molecular weight of 19,500, and its molecular weight distribution was 2.1. In the ethyl acrylate/acrylic acid copolymer block in this, the molar ratio of ethyl acrylate/acrylic acid was 9317.

Reference Example 3
[Production of Block Copolymer (II-3) (di-block copolymer of polystyrene block-acrylonitrile/styrene copolymer block)]

(1) Mercapto-terminated polystyrene was prepared in the same manner as in (1) and (2) of Reference Example 1.

(2) 22.5 kg of styrene, 7.5 kg of acrylonitrile, 48 kg of toluene, and 30 kg of the mercapto-terminated polystyrene that had been obtained in (1) were fed into a 200-liter polymerizer, which was then fully purged with nitrogen at 90° C. Next, a 10 wt. % solution in toluene of the same radical polymerization initiator as that used in Reference Example 1 was fed into the polymerizer at a flow rate of 200 ml/hr to initiate the polymerization of the monomer. Then, the polymerization was stopped just after the degree of polymerization (the degree of conversion into polymer) reached 95%. From the resulting reaction mixture, removed were the solvent and the non-reacted monomer. Thus was obtained a di-block copolymer of polystyrene block acrylonitrile/styrene copolymer block. This is hereinafter referred to as block copolymer (II-3).

(3) In the block copolymer (II-3) obtained in (2), the number-average molecular weight of the polystyrene block was 10,000, and that of the acrylonitrile/styrene copolymer block was 10,000. The block copolymer (II-3) thus had a number average molecular weight of 20,000, and its molecular weight distribution was 2.1. In the acrylonitrile/styrene copolymer block in this, the molar ratio of acrylonitrile/styrene was 40/60.

Reference Example 4
[Production of Block Copolymer (II-4) (di-block copolymer of polypropylene block-polymethyl methacrylate block)]

(1) Polypropylene (Mitsubishi NOBLEN MH8, manufactured by Mitsubishi Chemical Co.) was fed into a double-screw extruder, and melt-kneaded and pyrolyzed therein at 420° C. to prepare polypropylene having a double bond at its one end.

(2) 100 parts by weight of the double bond-terminated polypropylene as obtained in (1), 1000 parts by weight of toluene, and 30 parts by weight of thio-S-acetic acid were put into a reactor, which was then fully purged with nitrogen. Next, 10 parts by weight of 2,2'-azobisisobutyronitrile was added thereto, and the compounds in the reactor were reacted at 80° C. for 6 hours to prepare polypropylene having a thioacetyl group at its one end.

(3) 60 parts by weight of the thioacetyl-terminated polypropylene obtained in (2) was dissolved in a mixed solvent comprised of 100 parts by weight of toluene and 20 parts by weight of n-butanol, to which was added 1 part by weight of 7% solution of potassium hydroxide in butanol. Thus, the compounds were reacted at a reflux point of toluene in nitrogen for 6 hours to prepare mercapto-terminated polypropylene.

(4) 50 parts by weight of the mercapto-terminated polypropylene as obtained in (3) was dissolved in 184 parts by weight of toluene, to which was added 42 parts by weight of methyl methacrylate. The monomer, methyl methacrylate was thus polymerized at 90° C. in nitrogen, while adding thereto 1,1'-azobis(cyclohexane-1-carbonitrile) so that the rate of polymerization of the monomer might be about 10% per hour, and the reaction was stopped just after the degree of polymerization reached 95%. From the resulting reaction mixture, removed were the solvent and the non-reacted monomer. Thus was obtained a di-block copolymer of polypropylene block-polymethyl methacrylate block. This is hereinafter referred to as block copolymer (II-4).

(5) In the block copolymer (II-4) obtained in (4), the number-average molecular weight of the polypropylene block was 13,000, and that of the polymethyl methacrylate block was 12,000. The block copolymer (II-4) thus had a number-average molecular weight of 25,000, and its molecular weight distribution was 2.5.

Reference Example 5
[Production of Block Copolymer (II-5) (di-block copolymer of polyisobutylene block-polymethyl methacrylate block)]

(1) 210 parts by weight of isobutylene, 800 parts by weight of methylene chloride, 1200 parts by weight of methylcyclohexane, 6.5 parts by weight of 2-chloro-2,4,4-trimethylpentane, 0.98 parts by weight of 2,6-dimethylpyridine, and 3.5 parts by weight of pyridine were fed into a reactor, to which was added 12.3 parts by weight of titanium tetrachloride, and reacted at −78° C. for 4 hours to prepare polyisobutylene. 140 parts by weight of the thus prepared polyisobutylene was dissolved in 6800 parts by weight of tetrahydrofuran, to which was added 280 parts by weight of potassium t-butoxide, and stirred under reflux for 20 hours to prepare polyisobutylene having a double bond at its one end.

(2) 100 parts by weight of the double bond-terninated polyisobutylene as prepared in (1), 200 parts by weight of toluene and 11 parts by weight of thio-S-acetic acid were put into a reactor, which was fully purged with nitrogen. Then, 1 part by weight of 2,2'-azobisisobutyronitrile was added thereto, and the compounds were reacted at 70° C. for 1 hour to prepare polyisobutylene having a thioacetyl group at its one end.

(3) 80 parts by weight of the thioacetyl-terminated polyisobutylene as obtained in (2) were dissolved in a mixed solvent comprised of 160 parts by weight of toluene and 40 parts by weight of methanol, to which was added 10 parts by weight of a 4% solution of sodium hydroxide in methanol, and reacted in nitrogen at 65° C. for 6 hours to prepare polyisobutylene having a mercapto group at its one end.

(4) 50 parts by weight of the mercapto-terminated polyisobutylene as obtained in (3) was dissolved in 184 parts by weight of toluene, to which was added 42 parts by weight of methyl methacrylate. The monomer, methyl methacrylate was thus polymerized at 90° C. in nitrogen, while adding thereto 1,1'-azobis(cyclohexane-1-carbonitrile) so that the rate of polymerization of the monomer might be about 10% per hour, and the reaction was stopped just after the degree of polymerization reached 95%. From the resulting reaction mixture, removed were the solvent and the non-reacted monomer. Thus was obtained a di-block copolymer of polyisobutylene block-polymethyl methacrylate block. This is hereinafter referred to as block copolymer (II-5).

(5) In the block copolymer (II-5) obtained in (4), the number-average molecular weight of the polyisobutylene block was 8,000, and that of the polymethyl methacrylate block was 6,000. The block copolymer (II-5) thus had a number-average molecular weight of 14,000, and its molecular weight distribution was 2.0.

Reference Example 6

[Production of Block Copolymer (II-6) (di-block copolymer of polyethylene block-polyethyl acrylate block)]

(1) Polyethylene (HIZEX HD700F, manufactured by Mitsui Petrochemical Polyethylene Co.) was fed into a double-screw extruder, and melt-kneaded and pyrolyzed therein at 420° C. to prepare polyethylene having a double bond at its one end.

(2) 100 parts by weight of the double bond-terminated polyethylene as obtained in (1) 1000 parts by weight of toluene, and 30 parts by weight of thio-S-acetic acid were put into a reactor, which was then fully purged with nitrogen. Next, 10 parts by weight of 2,2'-azobisisobutyronitrile was added thereto, and the compounds in the reactor were reacted at 80° C. for 6 hours to prepare polyethylene having a thioacetyl group at its one end.

(3) 60 parts by weight of the thioacetyl-terminated polyethylene obtained in (2) was dissolved in a mixed solvent comprised of 100 parts by weight of toluene and 20 parts by weight of n-butanol, to which was added 1 part by weight of 7% solution of potassium hydroxide in butanol. Thus, the compounds were reacted at a reference lux point of toluene in nitrogen for 6 hours to prepare mercapto-terminated polyethylene.

(4) 50 parts by weight of the mercapto-terminated polyethylene as obtained in (3) was dissolved in 184 parts by weight of toluene, to which was added 42 parts by weight of ethyl acrylate. The monomer, ethyl acrylate was thus polymerized at 70° C. in nitrogen, while adding thereto 1,1'-azobis(cyclohexane-1-carbonitrile) so that the rate of polymerization of the monomer might be about 10% per hour, and the reaction was stopped just after the degree of polymerization reached 95%. From the resulting reaction mixture, removed were the solvent and the non-reacted monomer. Thus was obtained a di-block copolymer of polyethylene block-polyethyl acrylate block. This is hereinafter referred to as block copolymer (II-6).

(5) In the block copolymer (II-6) obtained in (4), the number-average molecular weight of the polyethylene block was 6,000, and that of the polyethyl acrylate block was 5,000. The block copolymer (II-6) thus had a number-average molecular weight of 11,000, and its molecular weight distribution was 2.5.

Reference Example 7

[Production of Block Copolymer (II-7) (di-block copolymer of polypropylene block-ethyl acrylate/acrylic acid copolymer block)]

(1) Mercapto-terminated polypropylene was prepared in the same manner as in (1), (2) and (3) of Reference Example 4.

(2) 48.5 parts by weight of ethyl acrylate, 1.5 parts by weight of acrylic acid, and 50 parts by weight of mercapto-terminated polypropylene as obtained in (1) were dissolved in 150 parts by weight of toluene at 90° C. in a reactor, which was then fully purged with nitrogen. Next, a 2 wt. % solution in toluene of a radical polymerization initiator, "V-65" (manufactured by Wako Pure Chemicals Co.) was added thereto at a flow rate of 2 ml/hr to initiate the polymerization of the monomer. Then, the polymerization was stopped just after the degree of polymerization (the degree of conversion into polymer) reached 95%. From the resulting reaction mixture, removed were the solvent and the non-reacted monomer. Thus was obtained a di-block copolymer of polypropylene block-ethyl acrylate/acrylic acid copolymer block. This is hereinafter referred to as block copolymer (II-7).

(3) In the block copolymer (II-7) obtained in (2), the number-average molecular weight of the polypropylene block was 12,000, and that of the ethyl acrylate/acrylic acid copolymer block was 10,000. The block copolymer (II-7) thus had a number-average molecular weight of 22,000, and its molecular weight distribution was 3.3. In the ethyl acrylate/acrylic acid copolymer block in this, the molar ratio of ethyl acrylate/acrylic acid was 96/4.

Reference Example 8

[Production of Block Copolymer (II-8) (di-block copolymer of polypropylene block-acrylonitrile/styrene copolymer block)]

(1) Mercapto-terminated polypropylene was prepared in the same manner as in (1), (2) and (3) of Reference Example 4.

(2) 37.5 parts by weight of styrene, 12.5 parts by weight of acrylonitrile, and 50 parts by weight of the mercapto terminated polypropylene as obtained in (1) were dissolved in 150 parts by weight of toluene at 90° C. in a reactor, which was then fully purged with nitrogen. Next, a 2.3 wt. % solution in toluene of a radical polymerization initiator, "V-65" (manufactured by Wako Pure Chemicals Co.) was added thereto at a flow rate of 2 ml/hr to initiate the polymerization of the monomer. Then, the polymerization was stopped just after the degree of polymerization (the degree of conversion into polymer) reached 95%. From the resulting reaction mixture, removed were the solvent and the non-reacted monomer. Thus was obtained a di-block copolymer of polypropylene block acrylonitrile/styrene copolymer block. This is hereinafter referred to as block copolymer (II-8).

(3) In the block copolymer (II-8) obtained in (2), the number-average molecular weight of the polypropylene block was 12,000, and that of the acrylonitrile/styrene copolymer block was 8,000. The block copolymer (II-8) thus had a number average molecular weight of 20,000, and its molecular weight distribution was 3.2. In the acrylonitrile/styrene copolymer block in this, the molar ratio of acrylonitrile/styrene was 40/60.

Examples 1 to 8

(1) As the thermoplastic elastic polymer (I), used herein was SEPS (1) (hydrogenated tri-block copolymer of polystyrene block-polyisoprene block-polystyrene block). 100 parts by weight of SEPS (1) was mixed with 43 parts by weight of any one of the block copolymers (II-1) to (II-8) that had been obtained in Reference Examples 1 to 8. To 100 parts by weight of the resulting mixture, added was 0.1 parts by weight of an antioxidant, "Irganox 1010" (manufactured by Ciba-Geigy AG) to prepare a thermoplastic polymer composition. Using this, prepared were test samples according to the method mentioned hereinabove. Their tensile strength, tensile elongation and hardness were measured and their outward appearance was checked, according to the methods also mentioned hereinabove. The results obtained are shown in Table 1 below.

(2) An ABS resin sheet was used herein as a hard resin sheet to be previously set in a mold. According to the method mentioned hereinabove, formed was a laminate having an ABS resin layer and a layer of the thermoplastic polymer composition prepared herein. Test samples were cut out of this laminate, and their peeling strength was measured according to the method mentioned hereinabove. The data obtained are shown in Table 1.

Comparative Examples 1 to 3

Test samples were prepared in the same manner as in Examples 1 to 8, except that SEPS (1) was used alone (in Comparative Example 1) or that 3 parts by weight (in Comparative Example 2) or 100 parts by weight (in Comparative Example 3) of the block copolymer (II-1) prepared in Reference Example 1 was added to 100 parts by weight of SEPS (1). Their tensile strength, tensile elongation and hardness were measured and their outward appearance was checked, according to the methods mentioned hereinabove. In addition, also in the same manner as in Examples 1 to 8, laminates were formed and test samples were cut out of them, and their peeling strength was measured according to the method mentioned hereinabove. The data obtained are shown in Table 1.

Comparative Examples 4 to 7

Test samples were prepared in the same manner as in Examples 1 to 8 using SEPS (1) as the thermoplastic elastic polymer (I), except that 43 parts by weight of any one of the polar polymers (a) to (d), in place of the block copolymer (II), was added to 100 parts by weight of SEPS (1). Their tensile strength, tensile elongation and hardness were measured and their outward appearance was checked, according to the methods mentioned hereinabove. In addition, also in the same manner as in Examples 1 to 8, laminates were formed and test samples were cut out of them, and their peeling strength was measured according to the method mentioned hereinabove. The data obtained are shown in Table 1.

polymer (I) (SEPS (1)) and from 5 to 95 parts by weight of the block copolymer (II), and a layer of the ABS resin sheet, have an extremely large peeling strength between the two layers. Accordingly, it is known from those data that in Examples 1 to 8 where the thermoplastic polymer composition of the invention is laminated with ABS resin through melt adhesion, smoothly obtained are high-quality laminates with no interlayer peeling.

In addition, the data in Table 1 further verify that, in Examples 1 to 8 using the thermoplastic polymer composition of the invention, obtained are shaped articles of high quality having good mechanical properties such as tensile strength and tensile elongation, having good flexibility and elasticity and having good outward appearance.

As opposed to those, it is known from the data in Table 1 that the laminates of Comparative Examples 1 to 3, for which was used only the thermoplastic elastic polymer (I) not combined with the block copolymer (II) in Comparative Example 1 or was used a thermoplastic polymer composition comprising the block copolymer (II), of which the amount was outside the defined scope of from 5 to 95 parts by weight, in Comparative Examples 2 and 3, have poor peeling strength. It is known therefrom that, in those comparative samples, the melt adhesiveness between the thermoplastic resin layer and the ABS resin layer is not good.

In addition, it is further known from the data in Table 1 that the peeling strength of the laminates of Comparative Examples 4 to 7, in which a thermoplastic polymer composition as prepared by adding any one of the polar polymers (a) to (d), in place of the block copolymer (II), to the thermoplastic elastic polymer (I) was laminated with an ABS resin sheet, is much lower than that of the laminates of Examples 1 to 8. Thus, it is known that in those Comparative Examples 4 to 7, the melt adhesiveness of the thermoplastic polymer composition used to ABS resin is poor. Moreover, it is also known that the tensile elongation of the samples of Comparative Examples 4 to 7 is much smaller than that of the samples of Examples 1 to 8 while the hardness of the former is higher than that of the latter, or that is, the former samples are less flexible and less elastic than the latter

TABLE 1

| | Formulations | | | Physical Properties | | | | |
|---|---|---|---|---|---|---|---|---|
| | SEPS (1) | Copolymer or Polar Polymer | | Tensile | Tensile | | | Peeling |
| Examples | Amount Added (wt. pts) | Compound | Amount Added (wt. pts) | Strength ($kg/cm^2$) | Elongation (%) | Hardness | Outward Appearance | Strength (kg/25 mm) |
| Example 1 | 100 | Block Copolymer (II-1) | 43 | 45 | 1700 | 38 | A | 3.8 |
| Example 2 | 100 | Block Copolymer (II-2) | 43 | 38 | 1800 | 36 | A | 3.8 |
| Example 3 | 100 | Block Copolymer (II-3) | 43 | 39 | 1700 | 36 | A | 4.5 |
| Example 4 | 100 | Block Copolymer (II-4) | 43 | 42 | 1700 | 31 | A | 6.2 |
| Example 5 | 100 | Block Copolymer (II-5) | 43 | 40 | 1800 | 33 | A | 5.8 |
| Example 6 | 100 | Block Copolymer (II-6) | 43 | 41 | 1600 | 35 | A | 5.9 |
| Example 7 | 100 | Block Copolymer (II-7) | 43 | 40 | 1700 | 35 | A | 5.5 |
| Example 8 | 100 | Block Copolymer (II-8) | 43 | 45 | 1700 | 37 | A | 5.7 |
| Comp. Ex. 1 | 100 | — | 0 | 31 | 1800 | 30 | A | 1.5 |
| Comp. Ex. 2 | 100 | Block Copolymer (II-1) | 3 | 32 | 1800 | 31 | A | 1.9 |
| Comp. Ex. 3 | 100 | Block Copolymer (II-1) | 100 | 11 | 450 | 61 | C | 1.4 |
| Comp. Ex. 4 | 100 | Polar Polymer (a) | 43 | 44 | 543 | 60 | C | 2.8 |
| Comp. Ex. 5 | 100 | Polar Polymer (b) | 43 | 48 | 581 | 59 | C | 2.9 |
| Comp. Ex. 6 | 100 | Polar Polymer (c) | 43 | 43 | 421 | 63 | C | 2.8 |
| Comp. Ex. 7 | 100 | Polar Polymer (d) | 43 | 50 | 610 | 55 | C | 2.5 |

The data in Table 1 above verify that the laminate samples of Examples 1 to 8, which are composed of a layer of the thermoplastic polymer composition of the invention comprised of 100 parts by weight of the thermoplastic elastic samples. Further, the outward appearance of the samples of Comparative Examples 4 to 7 is bad. Thus, it is known that in those Comparative Examples 4 to 7, high-quality articles could not be obtained.

Examples 9 to 14

As the thermoplastic elastic polymer (I), herein used was any one of SEPS (2) (hydrogenated tri-block copolymer of polystyrene block-polyisoprene block-polystyrene block), SEEPS (1) (hydrogenated tri-block copolymer of polystyrene block-isoprene/butadiene copolymer block-polystyrene block) and SEEPS (2) (hydrogenated tri-block copolymer of polystyrene block- isoprene/butadiene copolymer block-polystyrene block). 100 parts by weight of the thermoplastic elastic polymer (I) was mixed with 43 parts by weight of any of the block copolymer (II-1) or (II-4) as prepared in Reference Example 1 or 4. Using the resulting mixture, prepared were test samples and laminates in the same manner as in Examples 1 to 8. Test samples were cut out of those laminates. Those test samples prepared herein were tested to measure and evaluate their physical properties, in the same manner as in Examples 1 to 8, and the results obtained are shown in Table 2 below.

Comparative Examples 8 to 11

Test samples and laminates were prepared in the same manner as in Examples 9 to 14, except that SEPS (2), SEEPS (1) or SEEPS (2) was used alone (in Comparative Examples 8 to 10) or that 3 parts by weight of the block copolymer (II-1) as prepared in Reference Example 1 was mixed with 100 parts by weight of SEEPS (1) (in Comparative Example 11). Test samples were cut out of those laminates. Those test samples prepared herein were tested to measure and evaluate their physical properties, in the same manner as in Examples 1 to 8, and the results obtained are shown in Table 2.

(II-4), and a layer of the ABS resin sheet, have an extremely large peeling strength between the two layers.

In addition, the data in Table 2 further verify that, in Examples 9 to 14 using the thermoplastic polymer composition of the invention, obtained are shaped articles of high quality having good mechanical properties such as tensile strength and tensile elongation, having good flexibility and elasticity and having good outward appearance.

As opposed to those, it is known from the data in Table 2 that the laminates of Comparative Examples 8 to 11, for which was used only the thermoplastic elastic polymer (I) combined with neither the block copolymer (II-1) nor the block copolymer (II-4) in Comparative Examples 8 to 10 or was used a thermoplastic polymer composition comprising the block copolymer (II-1), of which the amount was smaller than 5 parts by weight in Comparative Example 11, have poor peeling strength. It is known therefrom that, in those comparative samples, the melt adhesiveness between the thermoplastic resin layer and the ABS resin layer is not good.

Examples 15 to 34

(1) As the thermoplastic elastic polymer (I), used herein was SEPS (2). 100 parts by weight of SEPS (2) was mixed with 43 parts by weight of any one of the block copolymer (II-2) or (II-4) that had been obtained in Reference Example 2 or 4. To 100 parts by weight of the resulting mixture, added was 0.1 parts by weight of an antioxidant, "Irganox 1010" (manufactured by Ciba-Geigy AG) to prepare a thermoplastic polymer composition.

(2) As the hard resin sheet to be previously set in a mold, used was a sheet of the hard resin shown in Table 3 below. According to the method mentioned hereinabove, formed

TABLE 2

| Examples | Formulations Elastic Polymer (I)[1) Compound | Amount Added (wt. pts) | Amount of Block Copolymer Added (wt. pts) II-1 | II-4 | Physical Properties Tensile Strength (kg/cm$^2$) | Tensile Elongation (%) | Hardness | Outward Appearance | Peeling Strength (kg/25 mm) |
|---|---|---|---|---|---|---|---|---|---|
| Example 9 | SEPS (2) | 100 | 43 | 0 | 220 | 700 | 86 | A | 4.2 |
| Example 10 | SEEPS (1) | 100 | 43 | 0 | 380 | 570 | 76 | A | 3.8 |
| Example 11 | SEEPS (2) | 100 | 43 | 0 | 400 | 570 | 82 | A | 3.7 |
| Example 12 | SEPS (2) | 100 | 0 | 43 | 225 | 710 | 82 | A | 5.5 |
| Example 13 | SEEPS (1) | 100 | 0 | 43 | 400 | 600 | 79 | A | 6.1 |
| Example 14 | SEEPS (2) | 100 | 0 | 43 | 420 | 590 | 83 | A | 5.9 |
| Comp. Ex. 8 | SEPS (2) | 100 | 0 | 0 | 220 | 710 | 80 | A | 0.5 |
| Comp. Ex. 9 | SEEPS (1) | 100 | 0 | 0 | 220 | 750 | 79 | A | 0.8 |
| Comp. Ex. 10 | SEEPS (2) | 100 | 0 | 0 | 400 | 570 | 81 | A | 0.8 |
| Comp. Ex. 11 | SEEPS (1) | 100 | 3 | 0 | 210 | 720 | 79 | A | 0.9 |

[1)]Thermoplastic elastic polymer (I)

The data in Table 2 above verify that the laminate samples of Examples 9 to 14, which are composed of a layer of the thermoplastic polymer composition of the invention comprised of 100 parts by weight of the thermoplastic elastic polymer (I) (SEPS (2), SEEPS (1) or SEEPS (2)) and from 5 to 95 parts by weight of the block copolymer (II-1) or were laminates having a layer of the hard resin shown in Table 3 and a layer of the thermoplastic polymer composition prepared in (1). Test samples were cut out of those laminates, and their peeling strength was measured according to the method mentioned hereinabove. The data obtained are shown in Table 3.

TABLE 3

| Examples | Hard Resin Sheet (type of resin) | Block Copolymer | Peeling Strength (kg/25 mm) | Examples | Hard Resin Sheet (type of resin) | Block Copolymer | Peeling Strength (kg/25 mm) |
|---|---|---|---|---|---|---|---|
| Example 15 | PP | II-2 | 3.4 | Example 25 | PPE | II-2 | 4.6 |
| Example 16 | | II-4 | 5.8 | Example 26 | | II-4 | 5.0 |
| Example 17 | PMMA | II-2 | 3.5 | Example 27 | PA66 | II-2 | 3.2 |
| Example 18 | | II-4 | 4.5 | Example 28 | | II-4 | 5.0 |
| Example 19 | PBT | II-2 | 3.8 | Example 29 | PVC | II-2 | 3.7 |
| Example 20 | | II-4 | 4.7 | Example 30 | | II-4 | 5.2 |
| Example 21 | POM | II-2 | 4.1 | Example 31 | PVDF | II-2 | 3.5 |
| Example 22 | | II-4 | 4.9 | Example 32 | | II-4 | 5.1 |
| Example 23 | PC | II-2 | 3.4 | Example 33 | PVDC | II-2 | 4.1 |
| Example 24 | | II-4 | 4.0 | Example 34 | | II-4 | 5.0 |

The data in Table 3 verify that the thermoplastic polymer composition of the invention firmly adheres in melt to various polar or non-polar hard resins, irrespective of the degree of the polarity, if any, of the resins, and that, using the thermoplastic polymer composition of the invention, it is possible to smoothly form laminates comprising a layer of the composition and a layer of a different material. The laminates thus formed have large interlayer adhesion strength between the layers with no interlayer peeling therebetween.

Examples 35 to 46

(1) Various thermoplastic polymer compositions were prepared in the same manner as in (1) of Examples 15 to 34.

(2) Any of the metal sheets shown in Table 4 was previously set in a mold. According to the method mentioned hereinabove, formed were laminates having a layer of the metal sheet shown in Table 4 and a layer of the thermoplastic polymer composition prepared in (1). Test samples were cut out of those laminates, and their peeling strength was measured according to the method mentioned hereinabove. The data obtained are shown in Table 4.

TABLE 4

| Examples | Metal Sheet | Block Copolymer | Peeling Strength (kg/25 mm) | Examples | Metal Sheet | Block Copolymer | Peeling Strength (kg/25 mm) |
|---|---|---|---|---|---|---|---|
| Example 35 | Stainless | II-2 | 3.8 | Example 41 | Copper | II-2 | 4.2 |
| Example 36 | Steel | II-4 | 4.2 | Example 42 | | II-4 | 4.8 |
| Example 37 | Iron | II-2 | 4.1 | Example 43 | Tin plate | II-2 | 4.1 |
| Example 38 | | II-4 | 4.5 | Example 44 | | II-4 | 4.7 |
| Example 39 | Aluminum | II-2 | 4.0 | Example 45 | Galvanized | II-2 | 4.1 |
| Example 40 | | II-4 | 4.8 | Example 46 | steel | II-4 | 4.5 |

The data in Table 4 verify that the thermoplastic polymer composition of the invention firmly adheres in melt to various metals, and that, using the thermoplastic polymer composition of the invention, it is possible to smoothly form laminates comprising a layer of the composition and a layer of metal. The laminates thus formed have large interlayer adhesion strength between the layers with no interlayer peeling therebetween.

Examples 47 to 53

Test samples and laminates were prepared in the same manner as in Examples 1 to 8, except that SEPS (2) was used as the thermoplastic elastic polymer (I) and that 100 parts by weight of SEPS (2) was mixed with any one of the block copolymers (II-1) to (II-6) that had been prepared in Reference Examples 1 to 6, and polypropylene, "MA4" (manufactured by Mitsubishi Chemical Co.) as in Table 5 below, along with 120 parts by weight of process oil. Test samples were cut out of those laminates. Those test samples prepared herein were tested to measure and evaluate their physical properties, in the same manner as in Examples 1 to 8, and the results obtained are shown in Table 5.

Comparative Examples 12 and 13

Test samples and laminates were prepared in the same manner as in Examples 47 to 53, except that the block copolymer (II) was not added (in Comparative Example 12) or that 265 parts by weight of the block copolymer (II-1) was added (in Comparative Example 13). Test samples were cut out of those laminates. Those test samples prepared herein were tested to measure and evaluate their physical properties, in the same manner as in Examples 1 to 8, and the results obtained are shown in Table 5.

TABLE 5

|  | Examples | | | | | | | Comparative Examples | |
| --- | --- | --- | --- | --- | --- | --- | --- | --- | --- |
|  | 47 | 48 | 49 | 50 | 51 | 52 | 53 | 12 | 13 |
| Formulations | | | | | | | | | |
| SEPS (2)(wt. pts.) | 100 | 100 | 100 | 100 | 100 | 100 | 100 | 100 | 100 |
| Block Copolymer (II) | | | | | | | | | |
| Compound | (11-1) | (II-1) | (II-2) | (II-3) | (II-4) | (II-5) | (II-6) | — | (II-1) |
| Amount Added (wt. pts.) | 103 | 114 | 103 | 103 | 103 | 103 | 103 | 0 | 265 |
| Polypropylene (wt. pts.) | 20 | 45 | 20 | 20 | 20 | 20 | 20 | 20 | 20 |
| Process Oil (wt. pts.) | 120 | 120 | 120 | 120 | 120 | 120 | 120 | 120 | 120 |
| Physical Properties | | | | | | | | | |
| Tensile Strength (kg/cm$^2$) | 59 | 108 | 58 | 59 | 60 | 60 | 61 | 60 | 45 |
| Tensile Elongation (%) | 1000 | 900 | 1100 | 1000 | 1000 | 1000 | 1000 | 1100 | 310 |
| Hardness | 47 | 62 | 48 | 45 | 50 | 42 | 47 | 38 | 80 |
| Outward Appearance | A | A | A | A | A | A | A | A | C |
| Continuous Shapability | A | A | A | A | A | A | A | A | C |
| Peeling Strength (kg/25 mm) | 5.1 | 5.2 | 5.5 | 5.9 | 5.8 | 6.0 | 5.9 | 0.5 | 1.1 |

The data in Table 5 verify that the addition of polyolefins, such as polypropylene, and process oil to the thermoplastic polymer composition comprising the thermoplastic elastic polymer (I) and the block copolymer (II) is effective in improving the melt adhesiveness of the composition to hard resins such as ABS and in improving the peeling strength of the laminates comprising the layer of the composition.

Examples 54 to 57

Test samples and laminates were prepared in the same manner as in Examples 1 to 8, except that any one of SEPS (1), SEEPS (1) and SEEPS (2) was used as the thermoplastic elastic polymer (I) and that 100 parts by weight of the thermoplastic elastic polymer (I) was mixed with the block copolymer (II-2) as prepared in Reference Example 2, along with polypropylene, "MA4" (manufactured by Mitsubishi Chemical Co.) and process oil as in Table 6 below. Test samples were cut out of those laminates. Those test samples prepared herein were tested to measure and evaluate their physical properties, in the same manner as in Examples 1 to 8, and the results obtained are shown in Table 6.

Comparative Examples 14 to 18

Test samples and laminates were prepared in the same manner as in Examples 54 to 57, except that the block copolymer (II-2) was not added (in Comparative Examples 14, 17 and 18) or that 3 parts by weight or 265 parts by weight of the block copolymer (II-2) was, added (in Comparative Examples 15 and 16). Test samples were cut out of those laminates. Those test samples prepared herein were tested to measure and evaluate their physical properties, in the same manner as in Examples 1 to 8, and the results obtained are shown in Table 6.

TABLE 6

|  | Examples | | | | Comparative Examples | | | | |
| --- | --- | --- | --- | --- | --- | --- | --- | --- | --- |
|  | 54 | 55 | 56 | 57 | 14 | 15 | 16 | 17 | 18 |
| Formulations | | | | | | | | | |
| SEPS (1)(wt. pts.) | 100 | — | — | — | — | — | — | 100 | — |
| SEEPS (1)(wt. pts) | — | 100 | — | — | — | — | — | — | 100 |
| SEEPS (2)(wt. pts.) | — | — | 100 | 100 | 100 | 100 | 100 | | |
| Block Copolymer (II-2) | | | | | | | | | |
| Amount Added (wt. pts.) | 114 | 114 | 103 | 114 | 0 | 3 | 265 | 0 | 0 |
| Polypropylene (wt. pts.) | 20 | 20 | 20 | 45 | 20 | 20 | 20 | 20 | 20 |
| Process Oil (wt. pts.) | 120 | 120 | 120 | 120 | 120 | 120 | 120 | 120 | 120 |
| Physical Properties | | | | | | | | | |
| Tensile Strength (kg/cm$^2$) | 38 | 72 | 75 | 100 | 71 | 74 | 28 | 42 | 75 |
| Tensile Elongation (%) | 1500 | 1200 | 1100 | 1000 | 1100 | 1100 | 310 | 1600 | 1250 |
| Hardness | 38 | 45 | 55 | 65 | 42 | 42 | 80 | 37 | 43 |
| Outward Appearance | A | A | A | A | A | A | C | A | A |
| Continuous Shapability | A | A | A | A | A | A | C | A | A |
| Peeling Strength (kg/25 mm) | 4.6 | 4.9 | 5.6 | 5.5 | 0.7 | 0.8 | 1.1 | 1.5 | 1.1 |

The data in Table 6 verify that, in Examples 54 to 57 using the thermoplastic polymer composition of the invention, obtained are shaped articles of high quality having good mechanical properties such as tensile strength and tensile elongation, having good flexibility and elasticity and having good outward appearance. In those Examples, the continuous shapability of the articles is good and their producibility is also good.

As opposed to those, it is known from the data in Table 6 that the laminates of Comparative Examples 14, 17 and 18, for which was used a thermoplastic polymer composition According to the method mentioned hereinabove, formed were laminates having a layer of the hard resin shown in Table 7 and a layer of the thermoplastic polymer composition prepared in (1). Test samples were cut out of those laminates, and their peeling strength was measured according to the method mentioned hereinabove. The data obtained are shown in Table 7.

TABLE 7

| Examples | Hard Resin Sheet (type of resin) | Block Copolymer | Peeling Strength (kg/25 mm) | Examples | Hard Resin Sheet (type of resin) | Block Copolymer | Peeling Strength (kg/25 mm) |
|---|---|---|---|---|---|---|---|
| Example 58 | PP | II-2 | 5.2 | Example 68 | PPE | II-2 | 4.6 |
| Example 59 |  | II-4 | 5.1 | Example 69 |  | II-4 | 5.1 |
| Example 60 | PMMA | II-2 | 4.8 | Example 70 | PA66 | II-2 | 4.5 |
| Example 61 |  | II-4 | 5.1 | Example 71 |  | II-4 | 5.8 |
| Example 62 | PBT | II-2 | 4.3 | Example 72 | PVC | II-2 | 3.2 |
| Example 63 |  | II-4 | 5.1 | Example 73 |  | II-4 | 5.9 |
| Example 64 | POM | II-2 | 4.4 | Example 74 | PVDF | II-2 | 4.9 |
| Example 65 |  | II-4 | 4.9 | Example 75 |  | II-4 | 5.5 |
| Example 66 | PC | II-2 | 4.6 | Example 76 | PVDC | II-2 | 4.8 |
| Example 67 |  | II-4 | 4.9 | Example 77 |  | II-4 | 5.2 | not containing the block copolymer (II-2), those of Comparative Example 15, for which was used a thermoplastic polymer composition containing the block copolymer (II-2) but in which the amount of the block copolymer (II-2) added was smaller than 5 parts by weight, and those of Comparative Example 16, for which was used a thermoplastic polymer composition containing 265 parts by weight of the block copolymer (II-2) and in which the amount of the block copolymer (II-2) added was outside the defined scope of the invention, all have poor peeling strength. It is known therefrom that, in those comparative samples, the melt adhesiveness between the thermoplastic resin layer and the ABS resin layer is not good.

Examples 58 to 77

(1) As the thermoplastic elastic polymer (I), used herein was SEEPS (2). 100 parts by weight of SEEPS (2) was mixed with 114 parts by weight of any one of the block copolymer (II-2) or (II-4) that had been obtained in Reference Example 2 or 4, along with 20 parts by weight of polypropylene, "MA4" (manufactured by Mitsubishi Chemical Co.) and 120 parts by weight of process oil, to which was added 0.1 parts by weight of an antioxidant, "Irganox 1010" (manufactured by Ciba-Geigy AG). Thus was prepared a thermoplastic polymer composition.

(2) As the hard resin sheet to be previously set in a mold, used was a sheet of the hard resin shown in Table 7 below.

The data in Table 7 verify that the thermoplastic polymer composition of the invention firmly adheres in melt to various polar or non-polar hard resins, irrespective of the degree of the polarity, if any, of the resins, and that, using the thermoplastic polymer composition of the invention, it is possible to smoothly form laminates comprising a layer of the composition and a layer of a different material. The laminates thus formed have large interlayer adhesion strength between the layers with no interlayer peeling therebetween.

Examples 78 to 89

(1) Various thermoplastic polymer compositions were prepared in the same manner as in (1) of Examples 58 to 77.

(2) Any of the metal sheets shown in Table 8 was previously set in a mold. According to the method mentioned hereinabove, formed were laminates having a layer of the metal sheet shown in Table 8 and a layer of the thermoplastic polymer composition prepared in (1). Test samples were cut out of those laminates, and their peeling strength was measured according to the method mentioned hereinabove. The data obtained are shown in Table 8.

TABLE 3

| Examples | Metal Sheet | Block Copolymer | Peeling Strength (kg/25 mm) | Examples | Metal Sheet | Block Copolymer | Peeling Strength (kg/25 mm) |
|---|---|---|---|---|---|---|---|
| Example 78 | Stainless | II-2 | 4.8 | Example 84 | Copper | II-2 | 5.1 |
| Example 79 | Steel | II-4 | 5.1 | Example 85 |  | II-4 | 5.2 |
| Example 80 | Iron | II-2 | 4.3 | Example 86 | Tin Plate | II-2 | 4.8 |
| Example 81 |  | II-4 | 5.2 | Example 87 |  | II-4 | 5.1 |
| Example 82 | Aluminum | II-2 | 5.2 | Example 88 | Galvanized | II-2 | 4.7 |
| Example 83 |  | II-4 | 5.1 | Example 89 | Steel | II-4 | 5.1 |

The data in Table 8 verify that the thermoplastic polymer composition of the invention firmly adheres in melt to various metals, and that, using the thermoplastic polymer composition of the invention, it is possible to smoothly form laminates comprising a layer of the composition and a layer of metal. The laminates thus formed have large interlayer adhesion strength between the layers with no interlayer peeling therebetween.

Having now fully described the invention, it will be apparent to one of ordinary skill in the art that many changes and modifications can be made thereto without departing from the spirit or scope of the invention as set forth herein.

This application is based on Japanese Patent Application No.'s 9-069220, filed Mar. 6, 1997 and 9-354025, filed Dec. 9, 1997, the entire contents of each which are hereby incorporated by reference.

What is claimed as new and desired to be secured by Letters Patent of the United States is:

1. A thermoplastic polymer composition comprising:
   (1) 100 parts by weight of a thermoplastic elastic polymer (I) selected from the group consisting of:
      a block copolymer comprising:
         (A) an aromatic vinyl polymer block and
         (B) a conjugated diene polymer block,
            a hydrogenate of said block copolymer, and
            a mixture thereof; and
   (2) 5–95 parts by weight of a block copolymer (II) comprising:
         (C) a polymer block comprising an olefinic monomer; and
         (D) a polymer block comprising at least one constitutional unit selected from the group consisting of (meth)acrylic acid, a (meth)acrylate and (meth)acrylonitrile.

2. The thermoplastic polymer composition as claimed in claim 1, wherein said (meth)acrylic acid, (meth)acrylates, and (meth)acrylonitrile constituting said polymer block (D) are selected from the group consisting of acrylic acid, methacrylic acid, methyl acrylate, ethyl acrylate, propyl acrylate, butyl acrylate, 2-ethylhexyl acrylate, dodecyl acrylate, 2-hydroxy ethyl acrylate, methyl methacrylate, ethyl methacrylate, propyl methacrylate, butyl methacrylate, 2-ethylhexyl methacrylate, dodecyl methacrylate, 2-hydroxy ethyl methacrylate, glycidyl acrylate, glycidyl methacrylate, dimethylaminoethyl acrylate and quaternary salts thereof, dimethylaminoethyl methacrylate and quaternary salts thereof, acrylonitrile, and methacrylonitrile, and mixtures thereof.

3. The thermoplastic polymer composition as claimed in claim 1, wherein said hydrogenate of said block copolymer comprises a partial or completely hydrogenated product of said conjugated diene polymer block (B).

4. The thermoplastic polymer composition as claimed in claim 3, wherein a degree of hydrogenation of the hydrogenated conjugated diene polymer block (B) is not smaller than 50 mol %.

5. The thermoplastic polymer composition as claimed in claim 1, wherein when said thermoplastic elastic polymer (I) does not comprise said hydrogenate of said block copolymer, said thermoplastic elastic polymer (I) comprises 5–75% by weight of aromatic vinyl monomers constituting said aromatic vinyl polymer block (A), based on the total weight of the nonhydrogenated thermoplastic elastic polymer (I).

6. The thermoplastic polymer composition as claimed in claim 1, wherein when said thermoplastic elastic polymer (I) does not comprise said hydrogenate of said block copolymer, the number-average molecular weight of said aromatic vinyl polymer block (A) is 500–100,000.

7. The thermoplastic polymer composition as claimed in claim 1, wherein when said thermoplastic elastic polymer (I) does not comprise said hydrogenate of said block copolymer, the number-average molecular weight of said conjugated diene polymer block (B) is 2,500–400,000.

8. The thermoplastic polymer composition as claimed in claim 1, wherein the number-average molecular weight of said polymer block (C) is 300–100,000.

9. The thermoplastic polymer composition as claimed in claim 1, wherein the number-average molecular weight of said polymer block (D) is 1,000–100,000.

10. The thermoplastic polymer composition as claimed in claim 1, wherein said aromatic vinyl polymer block (A) further comprises a structural unit of an ion-polymerizing comonomer.

11. The thermoplastic polymer composition as claimed in claim 10, wherein said ion-polymerizing comonomer is a monomer selected from the group consisting of 1-butene, pentene, hexene, butadiene, isoprene, and methyl vinyl ether, and mixtures thereof.

12. The thermoplastic polymer composition as claimed in claim 1, wherein said thermoplastic elastic polymer (I) further comprises one or more polar groups selected from the group consisting of hydroxyl groups, carboxyl groups, epoxy groups, and halide groups, and mixtures thereof at its molecular chain terminals and/or in its molecular chain.

13. A hot-melt adhesive comprising the thermoplastic polymer composition as claimed in claim 1.

14. A thermoplastic polymer composition comprising:
   (1) 100 parts by weight of a thermoplastic elastic polymer (I) selected from the group consisting of:
      a block copolymer comprising:
         (A) an aromatic vinyl polymer block and
         (B) a conjugated diene polymer block,
            a hydrogenate of said block copolymer, and
            a mixture thereof; and
   (2) a block copolymer (II) comprising:
         (C) a polymer block comprising an olefinic monomer; and
         (D) a polymer block comprising at least one constitutional unit selected from the group consisting of (meth)acrylic acid, a (meth)acrylate and (meth)acrylonitrile, and
   (3) at least one additional component selected from the group consisting of olefinic polymers, process oils, and mixtures thereof;
   wherein said block copolymer (II) is present in said thermoplastic polymer composition in an amount of 5 to 95 parts by weight relative to 100 parts by weight of the total weight of said thermoplastic elastic polymer (I) and said additional component, and wherein
   said additional component is present in said thermoplastic polymer composition in an amount of 10 to 500 parts by weight relative to 100 parts by weight of said thermoplastic elastic polymer (I).

15. The thermoplastic polymer composition as claimed in claim 14, wherein said (meth)acrylic acid, (meth)acrylates, and (meth)acrylonitrile constituting said polymer block (D) are selected from the group consisting of acrylic acid, methacrylic acid, methyl acrylate, ethyl acrylate, propyl acrylate, butyl acrylate, 2-ethylhexyl acrylate, dodecyl acrylate, 2-hydroxy ethyl acrylate, methyl methacrylate, ethyl methacrylate, propyl methacrylate, butyl methacrylate, 2-ethylhexyl methacrylate, dodecyl methacrylate, 2-hydroxy ethyl methacrylate, glycidyl acrylate, glycidyl methacrylate, dimethylaminoethyl acrylate and quaternary salts thereof, dimethylaminoethyl methacrylate and quaternary salts thereof, acrylonitrile, and methacrylonitrile, and mixtures thereof.

16. A hot-melt adhesive comprising the thermoplastic polymer composition as claimed in claim 14.

17. A laminated article, comprising:
a substrate; and
a layer of a thermoplastic polymer composition thereon, comprising:
(1) 100 parts by weight of a thermoplastic elastic polymer (I) selected from the group consisting of:
a block copolymer comprising:
(A) an aromatic vinyl polymer block and
(B) a conjugated diene polymer block,
a hydrogenate of said block copolymer, and
a mixture thereof; and
(2) 5–95 parts by weight of a block copolymer (II) comprising:
(C) a polymer block comprising an olefinic monomer, and
(D) a polymer block comprising at least one constitutional unit selected from the group consisting of (meth)acrylic acid, a (meth)acrylate, and (meth)acrylonitrile.

18. The laminated article as claimed in claim 17, wherein said (meth)acrylic acid, (meth)acrylates, and (meth)acrylonitrile constituting said polymer block (D) are selected from the group consisting of acrylic acid, methacrylic acid, methyl acrylate, ethyl acrylate, propyl acrylate, butyl acrylate, 2-ethylhexyl acrylate, dodecyl acrylate, 2-hydroxy ethyl acrylate, methyl methacrylate, ethyl methacrylate, propyl methacrylate, butyl methacrylate, 2-ethylhexyl methacrylate, dodecyl methacrylate, 2-hydroxy ethyl methacrylate, glycidyl acrylate, glycidyl methacrylate, dimethylaminoethyl acrylate and quaternary salts thereof, dimethylaminoethyl methacrylate and quaternary salts thereof, acrylonitrile, and methacrylonitrile, and mixtures thereof.

19. The laminated article as claimed in claim 17, further comprising at least one layer of material selected from the group consisting of polar material, non-polar material, metal, metallic material, a resin, plastics, rubber, wood, ceramics, paper, fabric, thermoplastic material, and mixtures thereof.

20. A laminated article, comprising:
a substrate; and
a layer of a thermoplastic polymer composition thereon, comprising:
(1) 100 parts by weight of a thermoplastic elastic polymer (I) selected from the group consisting of:
a block copolymer comprising:
(A) an aromatic vinyl polymer block and
(B) a conjugated diene polymer block,
a hydrogenate of said block copolymer, and
a mixture thereof; and
(2) a block copolymer (II) comprising:
(C) a polymer block comprising an olefinic monomer, and
(D) a polymer block comprising at least one constitutional unit selected from the group consisting of (meth)acrylic acid, a (meth)acrylate, and (meth)acrylonitrile, and
(3) at least one additional component selected from the group consisting of olefinic polymers, process oils, and mixtures thereof;
wherein said block copolymer (II) is present in said thermoplastic polymer composition in an amount of 5–95 parts by weight relative to 100 parts by weight of the total weight of said thermoplastic elastic polymer (I) and said additional component, and wherein
said additional component is present in said thermoplastic polymer composition in an amount of 10–500 parts by weight relative to 100 parts by weight of said thermoplastic elastic polymer (I).

21. The laminated article as claimed in claim 20, wherein said (meth)acrylic acid, (meth)acrylates, and (meth)acrylonitrile constituting said polymer block (D) are selected from the group consisting of acrylic acid, methacrylic acid, methyl acrylate, ethyl acrylate, propyl acrylate, butyl acrylate, 2-ethylhexyl acrylate, dodecyl acrylate, 2-hydroxy ethyl acrylate, methyl methacrylate, ethyl methacrylate, propyl methacrylate, butyl methacrylate, 2-ethylhexyl methacrylate, dodecyl methacrylate, 2-hydroxy ethyl methacrylate, glycidyl acrylate, glycidyl methacrylate, dimethylaminoethyl acrylate and quaternary salts thereof, dimethylaminoethyl methacrylate and quaternary salts thereof, acrylonitrile, and methacrylonitrile, and mixtures thereof.

22. The laminated article as claimed in claim 20, further comprising at least one layer of material selected from the group consisting of polar material, non-polar material, metal, metallic material, a resin, plastics, rubber, wood, ceramics, paper, fabric, thermoplastic material, and mixtures thereof.

* * * * *